(12) United States Patent
Grout et al.

(10) Patent No.: US 12,113,385 B2
(45) Date of Patent: Oct. 8, 2024

(54) INDUCTIVE CHARGING DEVICE

(71) Applicant: EAO Ltd, Sussex (GB)

(72) Inventors: Alex Grout, Sussex (GB); Peter Fairchild, Sussex (GB); Graham Love, London (GB); Charles Greenway, London (GB)

(73) Assignee: EAO Ltd, Burgess Hill (GB)

( * ) Notice: Subject to any disclaimer, the term of this patent is extended or adjusted under 35 U.S.C. 154(b) by 645 days.

(21) Appl. No.: 17/277,160

(22) PCT Filed: Sep. 18, 2019

(86) PCT No.: PCT/GB2019/052631
§ 371 (c)(1),
(2) Date: Mar. 17, 2021

(87) PCT Pub. No.: WO2020/058711
PCT Pub. Date: Mar. 26, 2020

(65) Prior Publication Data
US 2021/0376633 A1     Dec. 2, 2021

(30) Foreign Application Priority Data

Sep. 18, 2018   (GB) ..................... 1815222

(51) Int. Cl.
*H02J 7/00*     (2006.01)
*B60R 11/00*    (2006.01)
(Continued)

(52) U.S. Cl.
CPC ............ *H02J 7/0044* (2013.01); *B60R 11/02* (2013.01); *H02J 50/12* (2016.02);
(Continued)

(58) Field of Classification Search
USPC ........................................................ 320/108
See application file for complete search history.

(56) References Cited

U.S. PATENT DOCUMENTS

| | | | | |
|---|---|---|---|---|
| 5,588,055 A | * | 12/1996 | Williamson | ........ B60R 11/0241 |
| | | | | 379/426 |
| 2015/0373866 A1 | * | 12/2015 | Scholz | .................... H02J 50/10 |
| | | | | 29/434 |
| 2021/0376633 A1 | * | 12/2021 | Grout | .................... H02J 7/0044 |

FOREIGN PATENT DOCUMENTS

| | | |
|---|---|---|
| DE | 20 2005 013523 | 11/2005 |
| KR | 2014 0002927 | 5/2014 |
| WO | 2006/077453 | 7/2006 |

OTHER PUBLICATIONS

Search Report and Written Opinion from Application No. PCT/GB2019/052631 dated Nov. 18, 2019.

* cited by examiner

*Primary Examiner* — Mohammed Alam
(74) *Attorney, Agent, or Firm* — Troutman Pepper Hamilton Sanders LLP; Ryan A. Schneider; Dustin B. Weeks

(57) ABSTRACT

An inductive charging device for charging a mobile telephone within a public transport vehicle comprises a body section that includes an inductive charging device. A holder is provided for holding the mobile telephone in a fixed charging position relative to the inductive charging device. The holder includes a plurality of rigid arms that are fixed in position relative to the main body, and a plurality of biasing members movable between an extended position and a retracted position. The biasing members are arranged within the holder such that they are moved to the retracted position when the mobile telephone is inserted into the holder and in said retracted position apply an inwardly biasing force to the mobile telephone to hold it in the charging position.

19 Claims, 11 Drawing Sheets

(51) Int. Cl.
  *B60R 11/02* (2006.01)
  *H02J 50/10* (2016.01)
  *H02J 50/12* (2016.01)
  *H02J 50/90* (2016.01)

(52) U.S. Cl.
  CPC ................ *B60R 2011/0071* (2013.01); *B60R 2011/0075* (2013.01); *H02J 7/00034* (2020.01); *H02J 7/00045* (2020.01); *H02J 50/10* (2016.02); *H02J 50/90* (2016.02)

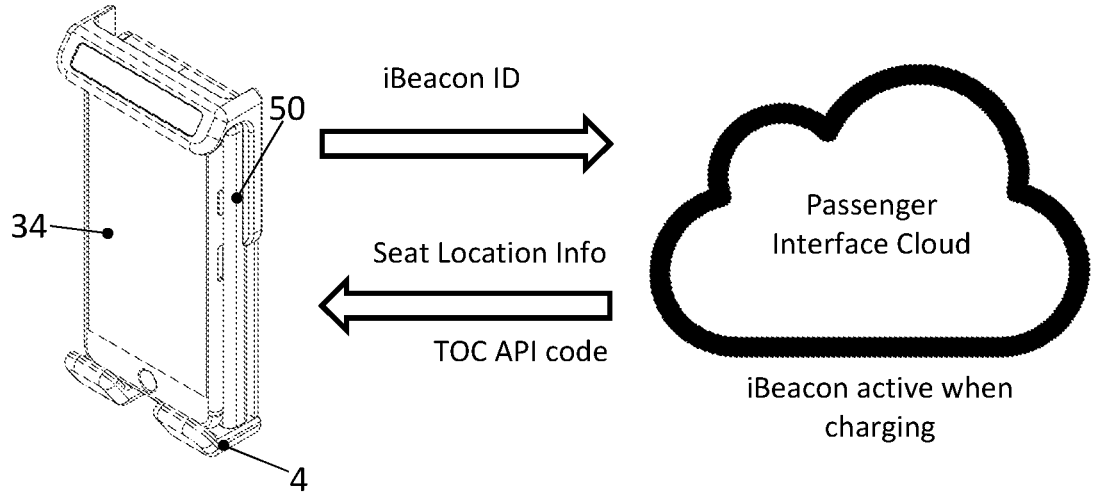
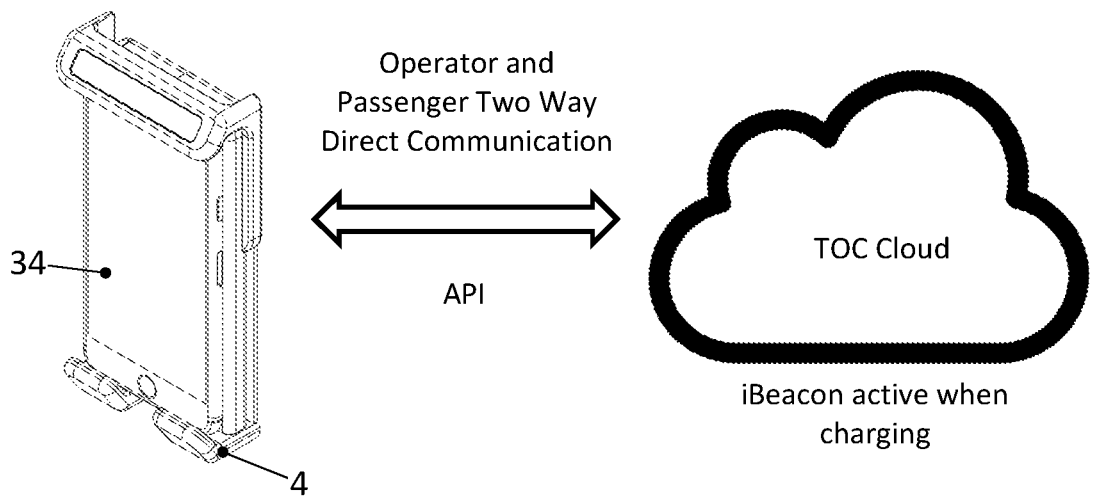
FIG. 12

INDUCTIVE CHARGING DEVICE

FIELD OF INVENTION

The present invention relates to an inductive charging device, and in particular an inductive charging device for use in a public transport environment.

BACKGROUND

Mobile telephones are increasingly used by passengers during journeys on public transport for e-ticketing applications and for on-board ticket payment. While such applications have efficiency and economy benefits for both the passenger and the operating company, the increasing reliance on such systems means that if passengers phones run out of battery charge they may not have an alternative means of payment and any e-ticket held on the phone is unavailable. In order to improve passenger experience public transport operators currently provide Wi-Fi access and power point facilities to allow passengers to access the internet during their journey. However, this relies on the passenger having a charging cable in their possession during the journey, which may not be the case. In addition, as e-ticketing, smart ticketing and smart seating systems develop, there is a desire for the operating companies to be able to directly link the passenger to the seat they are occupying, and to confirm that the seat has been occupied by them during the journey.

It is therefore desirable to provide an improved charging device for a mobile telephone which addresses the above described problems and/or which offers improvements generally.

SUMMARY

According to the present invention there is provided an inductive charging device as described in the accompanying claims.

In an embodiment of the invention there is provided an inductive charging device for charging a mobile telephone within a public transport vehicle, the device comprising a body section including an inductive charging device; a holder for holding the mobile telephone in a fixed charging position relative to the inductive charging device, the holder comprising a plurality of rigid arms, fixed in position relative to the main body, and a plurality of biasing members movable between an extended position and a retracted position, wherein the biasing members are arranged within the holder such that they are moved to the retracted position when the mobile telephone is inserted into the holder and in said retracted position apply an inwardly biasing force to the mobile telephone to it in said charging position. The use of biasing members secured within a rigid holder allows a range of mobile phone to be accommodated without the requirement for moving parts such as adjustable arms and therefore ensures the charging device is suitably robust for use in a public transport environment. In addition the biasing members provide a convenient and easy means of accommodating different phone sizes that doesn't require adjustment by the user.

Preferably the device further comprises a mounting for securing the charging device to the seat of a public transport vehicle.

The inductive charging device preferably comprises a planar front surface and the plurality of biasing members includes a first pair of lateral biasing members arranged within the holder such that in the retracted position they impart an inward biasing force in opposing lateral directions parallel to the front surface of the charging device.

The plurality of biasing members may further include at least one rearward biasing member arranged within the holder such that in the retracted position it imparts an inward biasing force in a rearward direction towards and the front surface of the charging device.

The holder preferably comprises a pair of support arms located on opposing sides of the main body, each arm includes a first laterally restraining section extending forwardly in a direction away from the front surface of the charging device, and a second forwardly restraining section extending inwardly from the first laterally restraining section in a direction parallel to the front surface of the charging device, and wherein the pair of support arms each have a distal end and the distal ends are laterally spaced from each to define a viewing space through which the screen of a mobile telephone is visible when held in the holder.

Each support arm preferably contains a grip member mounted on its inner surface, each grip member comprises one of the rearward biasing members and one of the lateral biasing members.

The grip members are preferably formed from spring steel and the biasing members are integral parts of the grip members. Alternatively the grip members may be formed from a polymer such as nylon.

The biasing members are preferably integral cantilever springs having an inwardly extending convex profile.

The holder is preferably configured to hold a mobile telephone in a vertical orientation.

The inductive charger preferably includes at least three inductive charging coils arranged along its length.

The inductive charging device preferably further comprises an iBeacon configured to communicate with a mobile telephone mounted within the charging device.

The iBeacon preferably has a unique identifier enabling the mobile phone mounted within the charger to be linked to the location of the charging device.

In another aspect of the invention there is provided a vehicle comprising a plurality of inductive charging device according to any preceding claim individually mounted each mounted to a corresponding one of a corresponding plurality of chairs within said public transport vehicle, each inductive charging device being connected to a power source with said vehicle.

In another aspect of the invention there is provided a seat for a public transport vehicle comprising a seat body and an inductive charging device according to any preceding claim mounted to said body.

In another aspect of the invention there is provided an inductive charging device for charging a mobile telephone within a public transport vehicle, the device comprising a body section including an inductive charging device, a holder for holding the mobile telephone in a fixed charging position relative to the inductive charging device, and an iBeacon configured to communicate with a mobile telephone mounted within the charging device.

The iBeacon preferably has a unique identifier enabling the mobile phone mounted within the charger to be linked to the location of the charging device.

In another aspect of the invention there is provided a system for associating a mobile electronic device with location within a vehicle comprising a plurality of beacon transmitters, each beacon transmitter being configured to broadcast identifier data to a mobile electronic device within range of the beacon transmitter and to be associated in use with a predetermined location within a vehicle; and a processor configured to receive the unique identifier data of the beacon transmitters from the mobile electronic device, identify in-vehicle location data corresponding to the unique identifier data, and return the in-vehicle location data to the mobile electronic device.

The term 'processor' is any means for processing data, and may include cloud based processing and/or software implemented processing or virtual machines.

Each transmitter preferably broadcasts identifier data that is unique to that transmitter, which is preferably an identification code.

The plurality of beacon transmitters are preferably Bluetooth Low Energy transmitters. Preferably the beacon unique identifier data is configured in accordance with the iBeacon protocol.

The plurality of transmitters are preferably each configured to be associated with one of a plurality of seats within a vehicle and the in-vehicle location data includes information identifying the location of the seat within the vehicle.

The system preferably further comprises a software application configured to operate on a mobile electronic device that is configured to receive the unique identifier data from a beacon transmitter, send a signal to the processor including the unique identifier data and receive a signal including in-vehicle location data from the processor relating to said unique identifier data.

The system preferably further comprises a database containing the unique identifier data of each beacon transmitter and data relating to the in-vehicle location of the seat with which each beacon transmitter is associated, wherein the processor is configured to, upon receipt of the unique identifier data of a beacon transmitter from a mobile electronic device, cross reference the unique identifier data with the database to identify the in-vehicle location data corresponding to the unique identifier data.

The system preferably further comprises a plurality of vehicle seats and wherein the plurality of beacon transmitters are in use arranged in a vehicle in a fixed location relative to the seats.

The plurality of beacon transmitters are preferably each configured to be mounted to one of a plurality of vehicle seats in use.

In another aspect of the invention there is provided a method of associating a mobile electronic device with a seat location within vehicle comprising providing a plurality of beacon transmitters, each beacon transmitter being configured to broadcast identifier data to a mobile electronic device within range of the beacon transmitter, associating each of the plurality of beacon transmitters with one of a plurality of vehicle seats by locating each of the plurality of beacon transmitters in a fixed location relative to a corresponding one of the plurality of seats within a vehicle; logging data relating to the unique identifier of each beacon transmitter and the location within the vehicle of the corresponding seat with which it is associated; and providing a processor configured to receive the unique identifier data of the beacon transmitters from a mobile electronic device, identify in-vehicle location data corresponding to the unique identifier data, and return the in-vehicle location data to the mobile electronic device.

BRIEF DESCRIPTION OF DRAWINGS

The present invention will now be described by way of example only with reference to the following illustrative figures in which:

FIG. 12 is a schematic representation of a system according to an embodiment of the invention.

DESCRIPTION OF EMBODIMENTS

Figure 1:
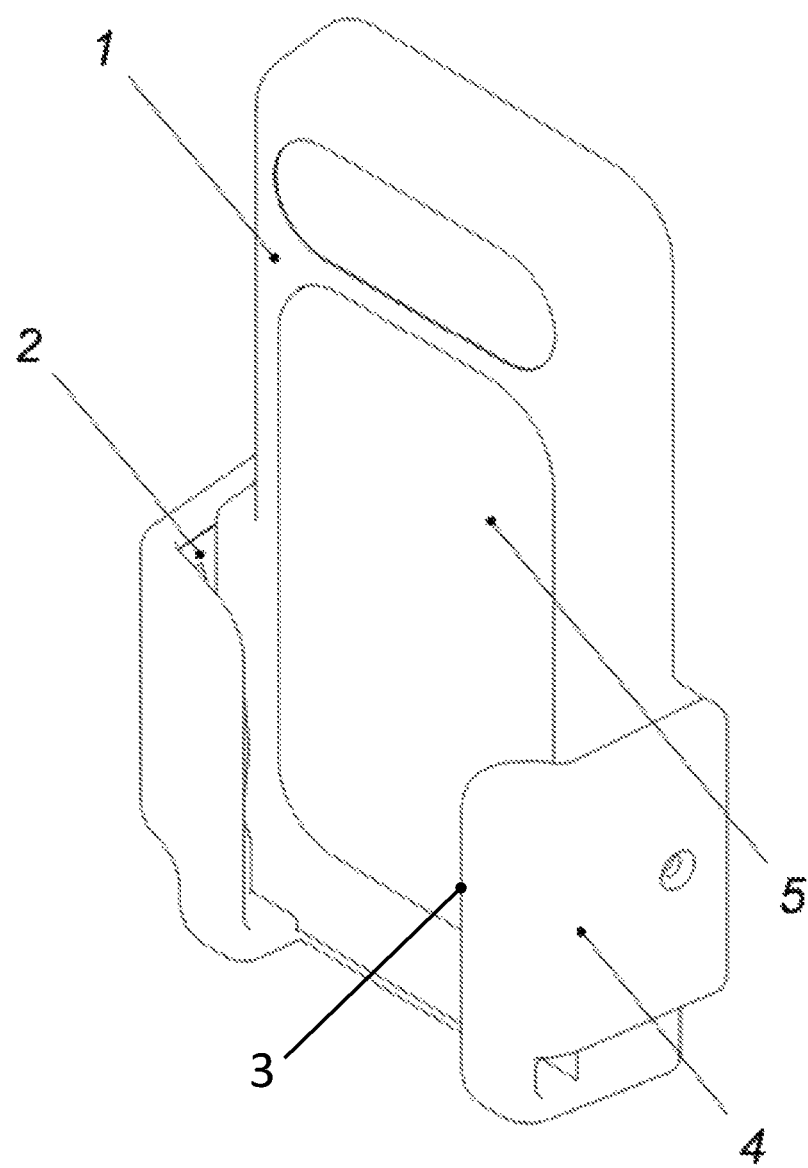
FIG. 1 shows a charging device according to an embodiment of the invention.

Referring to FIG. 1, an inductive charger device comprises a main body 1, an inductive charging unit 5 contained within the main body, and a holder or cradle 4 for receiving and supporting a mobile telephone and holding the mobile telephone against the charging unit 5. Grip means 2,3 are also provided for gripping the mobile telephone when received within the holder 4.

Figure 2:
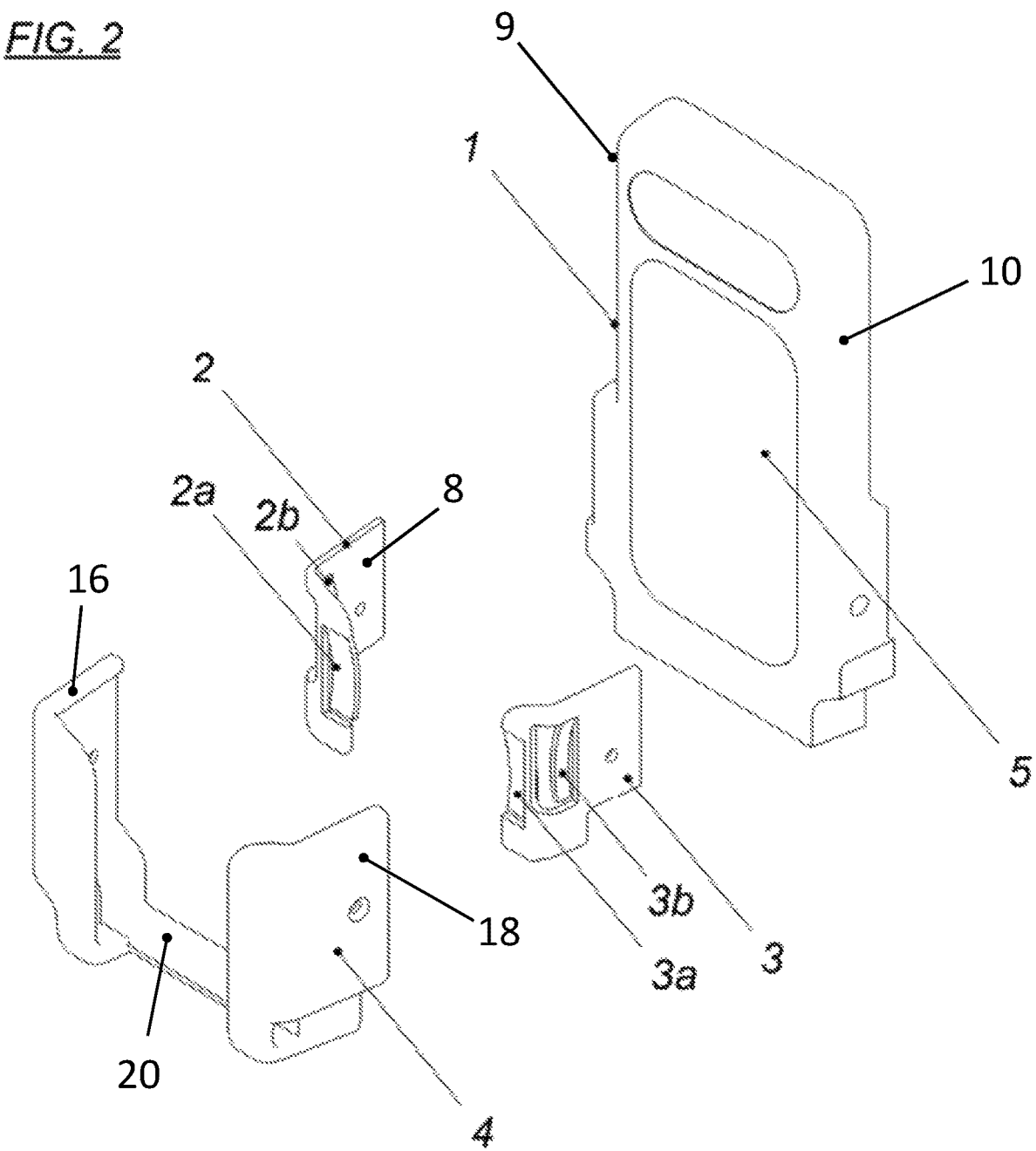
FIG. 2 is an exploded view of the charging device of FIG. 1.

As shown in FIG. 2, the main body 1 is substantially rectangular and corresponds in shape and size to a mobile telephone. The size of the main body 1 is selected to correspond to a larger mobile telephone to ensure that the device is suitable to receive mobile telephones of all sizes. The main body 1 is formed from a rigid, strong and light weight material such as die cast aluminium. For use in a public transport environment such as train carriage, the device must be robust and durable and able to withstand the application of significant forces such as collisions with passengers' bodies, being pulled by children, or attempted vandalism. The use of a die cast aluminium body provides such resilience.

The inductive charging unit 5 is housed within the main body 1. The inductive charging unit 5 comprises a plurality of planar charging coils arranged along the length of the body 1. Preferably the charging unit 5 comprises three charging coils arranged lengthwise along the body such that they are vertically adjacent each other when the main body 1 is arranged vertically in use. The use of three coils ensures that charging unit 5 is able to communicate with a corresponding coil in the mobile telephone regardless of the height of the device or positioning of the coil. The charging unit 5 is configured to comply with the Qi inductive charging standard for IOS and Android platforms. The charging unit 5 includes a power supply connection that is configured to be connected directly to the power supply within a vehicle such as a train or bus. A back plate secures the charging unit 5 within the main body 1 at the rear. The charger unit 5 comprises a substantially rectangular charger pad comprising a plastic body housing the charging coils. The charging unit 5 is mounted to the main body 1 within a recess or aperture in the centre of the main body 1. The charger unit 5 is preferably mounted such that it protrudes from the front face 10 of the main body 1. The charger unit 5 has a smooth tactile finish and by protruding from the front face 10 the phone does not contact the metal front face when held in contact with the charger unit 5. The phone therefore touches the smooth surface of the charge pad 5 rather than the metal of the main body 1 which prevents damage and scratches. The charging unit 5 may also include a beacon device such as a iBeacon, as described in further detail below.

The holder 4 comprises first and second L-shaped support arms 16,18 connected at their base by a bridging shelf 20 that forms the base of the holder 4. The holder 4 also includes a return along its lower edge to provide additional location for the mobile phone in its vertical orientation. The shelf 20 is arranged to support the base of the mobile telephone when received with the holder 4, while the support arms 16, 18 restrain the mobile telephone laterally and forwardly. The holder 4 includes grip means 2,3 for securely locating the phone within the holder 4 and preventing movement or rattle. The holder receives and retains the grip means 2,3. The support arms 16,18 receives and covers the grip means 2,3 such that they are not generally visible is use. The support arms 16,18 include connection apertures 22 which align with corresponding apertures in the grip means 2,3 through which a threaded fastener is inserted to secure the holder 4 and grip means 2,3 to the main body 1. The grip means 2,3 are arranged on the inner surface of the support arms 16,18 such that they are clamped between the main body 1 and the holder 4 to secure them in position within the holder 4.

The holder 4 is formed as a single piece component and is preferably formed from die cast aluminium. Both the main body 1 and the holder 4 may have a paint finish or coating applied, such a powder coating, or be over moulded with a polymer skin to provide a suitable aesthetic finish, and to provide a surface finish that protects the mobile telephone from surface damage such as scratching, as well as also prevent undesirable rattle. The grip means 2,3 are configured to provide some resistance when a user withdraws the phone in order keeps the phone in place during charging. By making it more difficult to and hence slower to remove the phone a quick theft from an opportunistic thief may be prevented.

The grip means 2, 3 comprise biasing members configured to be mounted at laterally opposing sides of the main body 1. The first grip means 2 comprises a substantially L-shaped metal body having a side wall 8a which secures to a first side 9 of the main body 1 and extends forwardly from the main body 1 parallel to the side 9 and perpendicular to the front face 10 of the main body 1. A second front wall 8b is arranged perpendicular to the side wall 8a and parallel to the front face 10 of the main body 1, and extends laterally inwards from the side wall 8a. The side wall 8a includes a first spring member 2a, and the front wall 8b includes a second spring member 2b. The side and front walls 8a,8b are preferably formed from folded spring steel, or from other suitable materials such as nylon, and the first and second spring members 2a,2b are cantilever springs punched from the first and second arm sections 8a,8b such that a first end is connected to the respective first or second arm section 8a,8b and the opposing distal end is unconnected and freely movable. The cantilever springs 2a,2b are preferably formed having a convex, inwardly extending profile. The first spring member 2a curves inwardly towards the opposing grip section 3 in a direction parallel to the front face 10 of the main body 1. The second spring member 2b faces inwardly towards the front face 10 in a direction perpendicular to the front face 10.

The second grip means 3 has substantially the same configuration as the first grip means 2, having a substantially L-shaped metal body having a first wall 12a which secures to a second side 14 of the main body 1 and extends forwardly from the main body 1 parallel to the side 14 and perpendicular to the front face 10 of the main body 1. A front wall 12b is arranged perpendicular to the first arm section 12a and parallel to the front face 10 of the main body 1 and extends inwardly in the direction of the first grip means 2. The side wall 12a includes a first spring member 3a, and the front wall 12b includes a second spring member 3b. The side and front walls 12a,12b are also formed from spring steel, and the first and second spring members 3a,3b are cantilever springs formed in the same manner as the spring members 2a,2b. The cantilever springs 3a,3b are preferably formed having a convex, inwardly extending profile. The first spring member 3a curves inwardly towards the opposing grip section 2 in a direction parallel to the front face 10 of the main body 1. The second spring member 3b faces inwardly towards the front face 10 in a direction perpendicular to the front face 10.

Figure 3:
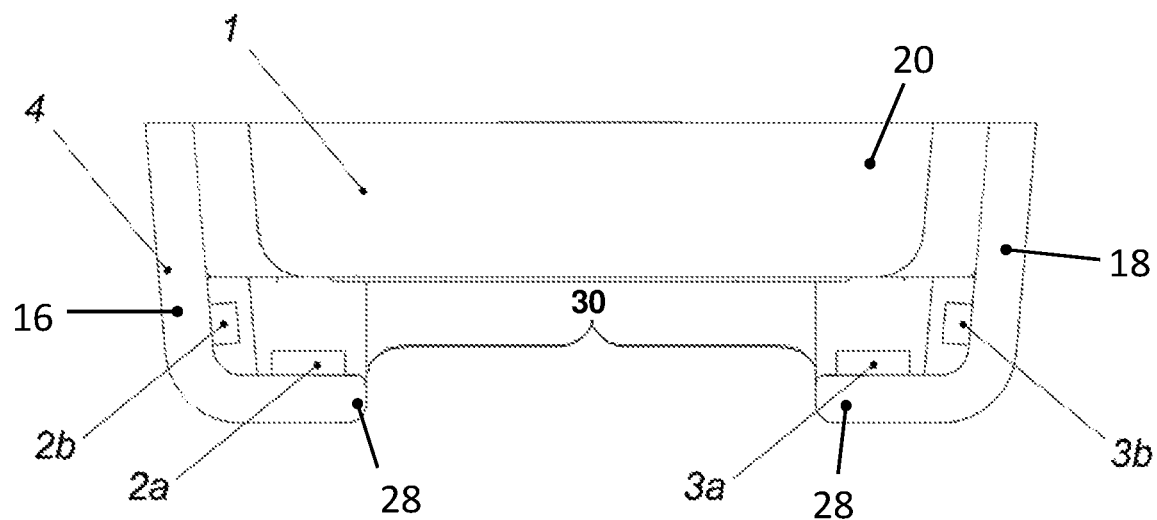
FIG. 3 shows is a plan view of the device of FIG. 1.
Figure 4:
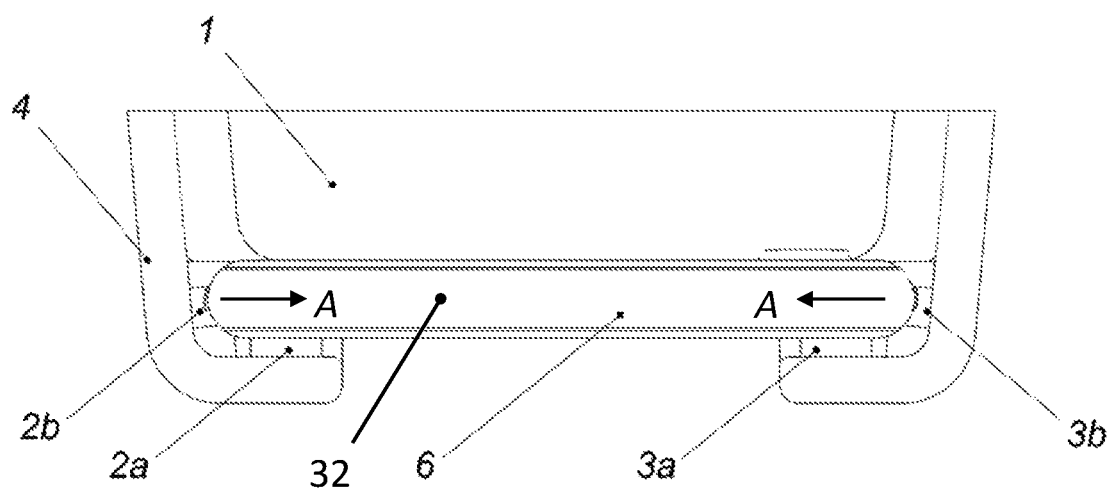
FIG. 4 shows is a plan view of the device of FIG. 1 with a wide mobile phone inserted.

The main body 1 and the holder 4 form an enclosure for receiving and cradling a lower portion of a mobile telephone. As shown in FIG. 3, the distal ends 28 of the support arms 16,18 are laterally spaced defining a gap 30 through which the screen of the mobile telephone may be viewed. The first spring members 2a,3a are arranged within the holder to deflect laterally in a direction parallel to the front face 10 of the main body when a phone is inserted into the holder. As shown in FIG. 4, as the side of the phone 32 engages with curved upper leading edge of the springs 2a,3a, the springs begin to deflect laterally outwards, providing a laterally inwardly biasing force A against the phone to laterally secure the phone within the holder. The springs 2a,3a are configured to have a distance of travel suitable for accommodating a wide range of phone widths. In a similar manner, the springs 2b,3b are deflected outwardly in a forward direction, perpendicular to the front face 10 of the main body 1 as the phone is inserted into the holder 4.

Figure 5:
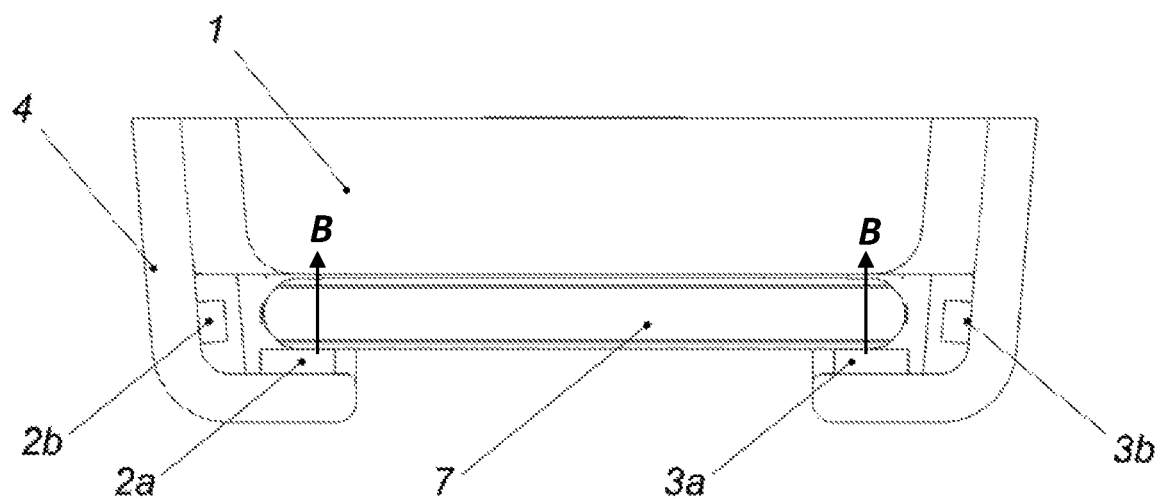
FIG. 5 is a plan view of the device of FIG. 1 with a narrower mobile phone inserted.

As shown in FIG. 5, the springs 3b,3b provide a biasing force B towards the front face 10, and towards the charging unit 5, to ensure the phone is held flat in engagement with the charging unit 5 during charging. The rigid arms 16,18 of the holder 4 are inflexible and provide an opposing force to the grip means 2,3 which allows the grip means to exert a biasing force against the phone, and enabling the grip means to adjust automatically to accommodate phones of varying widths and thicknesses. The shape and natural flex of springs of the grip means 2,3 allow this function and ensures correct location of the mobile phone within the holder 4 and in particular against the inductive charging surface.

The housing 4 is removable from the main body 1 by removal of the threaded fastener to enable the grip means 2,3 to be removed and replaced in the event that they become damages or worn. This part is removable to allow replacement of items 2 and 3 if they become damaged or worn. This also allows the holder 4 to be replaced with a holder of a different size to vary the size capacity of the charging device should the size range of mobile phones change.

Figure 6:
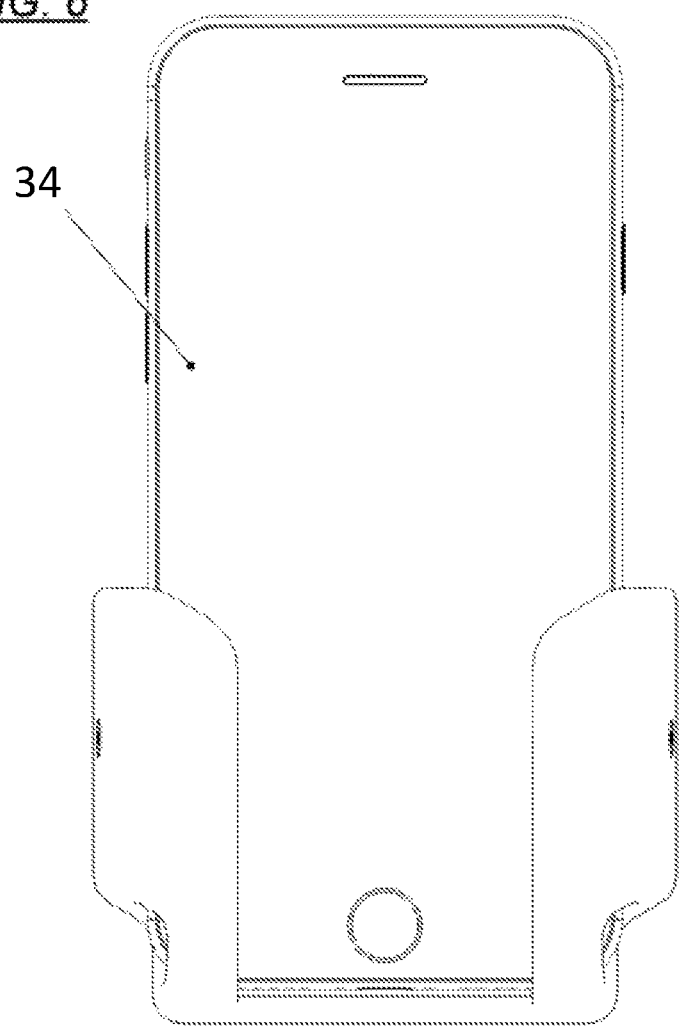
FIG. 6 is a front view of the device of FIG. 1 with a wide mobile phone inserted.
Figure 7:
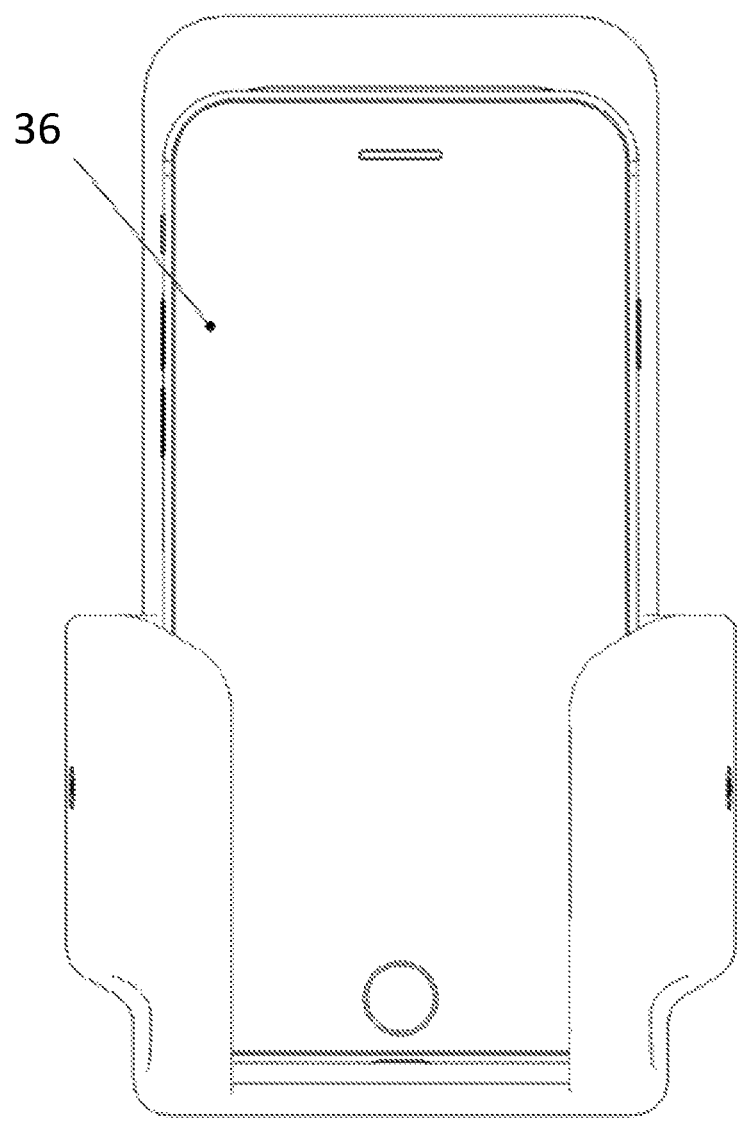
FIG. 7 is a front view of the device of FIG. 1 with a narrower mobile phone inserted.

FIG. 6 shows a large mobile 34 phone received within the charging device. The width of the phone 34 is only slightly smaller than the internal width of the holder 4. With the larger phone 34 received within the holder, the springs 2a,3a are deflected substantially to their maximum deflected position. FIG. 7 shows a smaller phone 36 received within the holder 4. Here the springs 2a,3b are subjected to less lateral direction. However the springs 2a are configured to ensure that sufficient biasing force is generated for this degree of deflection to still suitable retain an position the phone within the holder 4.

The main body 1 includes a mounting bracket which connects the main body to a support structure within a passenger vehicle, such as the rear panel of a train seat. The support mounting bracket may be configured to accommodate varying rear panel profiles to enable the charging device to retro fitted to a variety of different seat types. The mounting bracket may include a separate wedge member to be inserted between the mounting bracket and the seat to accommodate an angled rear panel. The charging device may further include a conduit for receiving an electrical cable for connecting the charging device to a power supply and for channeling the power cable within a vehicle seat. In an alternative embodiment the charging device may include a rotatable mounting for mounting the main body to a seta that enables the main body to be rotated relative to the seat. The rotatable mounting is preferably configured to rotate through +90 degrees and −90 degrees from the vertical to enable the phone to be rotated from portrait to landscape orientation. The mounting may include a vibration absorbing member to absorb vibration from the vehicle and avoid vibration of the phone when viewed by the passenger.

Figure 8:
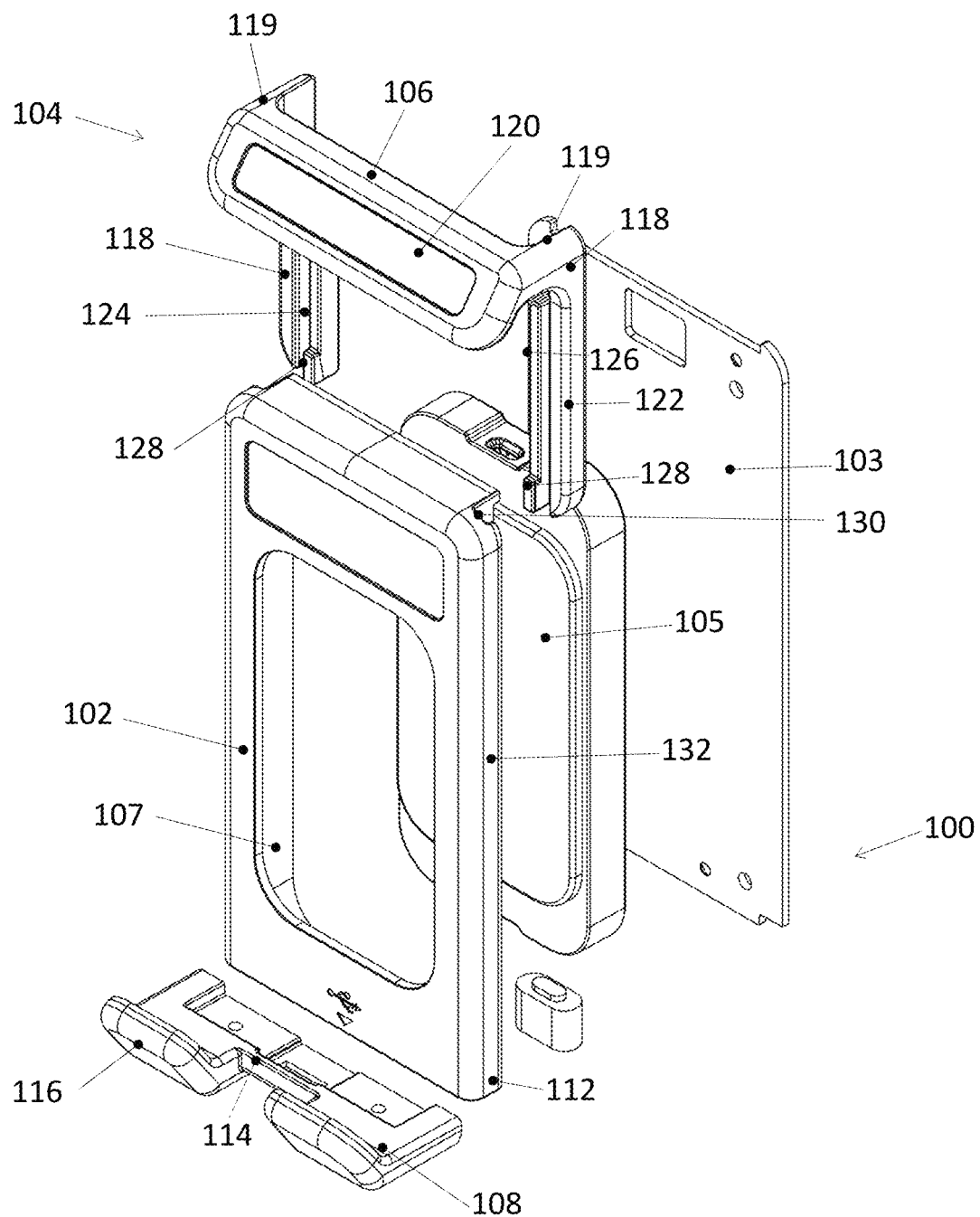
FIG. 8 is an exploded view of a charging device according to an embodiment of the invention.

FIG. 8 shows an alternative embodiment comprising a main body 100 comprising a front panel 102, a rear panel 103 and inductive charging unit 105. The charging device further includes a holder 104 comprising an upper clamping jaw 106 and a lower clamping jaw 108.

The inductive charging unit 105 is clamped between the front panel 102 and the rear panel 103, with the rear panel 103 being secured to the front panel 102 by threaded fasteners or any other suitable means. The front panel 102 includes an aperture 107 arranged to receive the front charging panel of the inductive charging unit 105 such that the charging panel is able to be contacted by a phone or other device from the front of the charging unit 100.

The lower clamping jaw 108 is secured to the lower surface 112 of the main body 100 and fixed in position relative to main body 100. The lower clamping jaw 108 includes a base panel 114 and a pair of upwardly angled feet 116 that are laterally spaced from each other and project forwardly and upwardly from the base 114.

The upper clamping jaw 106 includes a pair of laterally spaced legs 118 interconnected by the clamping member 120, which extends laterally between and bridges the legs 118. The clamping member 120 connected to the legs 118 by a pair of forwardly extending side arms 119 that space the clamping member 120 forwardly of the legs 118. The clamping member 120 is downwardly angled and projects forwardly and downwardly from the legs 118. Each leg 118 includes an outer rail 122, a guide channel 124 located inwardly of the outer part 118, and an inner guide rail 126 located inwardly of the guide channel. A forwardly projecting lug 128 is located at the base of each guide rail 126, which functions as a stop member.

The front panel 102 includes guide channels 130 formed on its rear surface on laterally opposing sides of the front panel 102. Each guide channel 130 extends downwardly length wise along the rear surface if the front panel 102. Each guide channel is flanked by an outer guide rail 132 formed by the side wall of the panel 102. The upper clamping jaw 106 and the front panel 102 are arranged such that the inner guide rails 126 are received within the guide channels 124 of the front panel 102, and the outer guide rails 132 of the front panel 102 are received within the guide channels 124 of the upper clamping jaw 106. The inner guide rails 126 of the upper clamping jaw 106 are thereby laterally restrained within the guide channels 124 of the front panel 102. When the main body 100 is assembled, the legs 118 of the upper clamping jaw 118 are clamped between the front panel 102 and the rear panel 104 with the inner guide rails 126 being slidingly received within the guide channels 124. The side arms 119 are arranged outwardly of the side edges of the front panel 102 and hold the clamping member 120 forwardly of the front surface of the front panel 102 to prevent interference therewith. The upper clamping jaw 106 is therefore able to slide vertically relative to the main body 100. In its lowermost position the legs 118 contact the base 114 of the lower clamping jaw 106 to limit downward movement. Stop members are located along the guide channels 124 that engage with the stop members 126 to provide an upper limit to movement of the upper clamping jaw 106.

Figure 9:
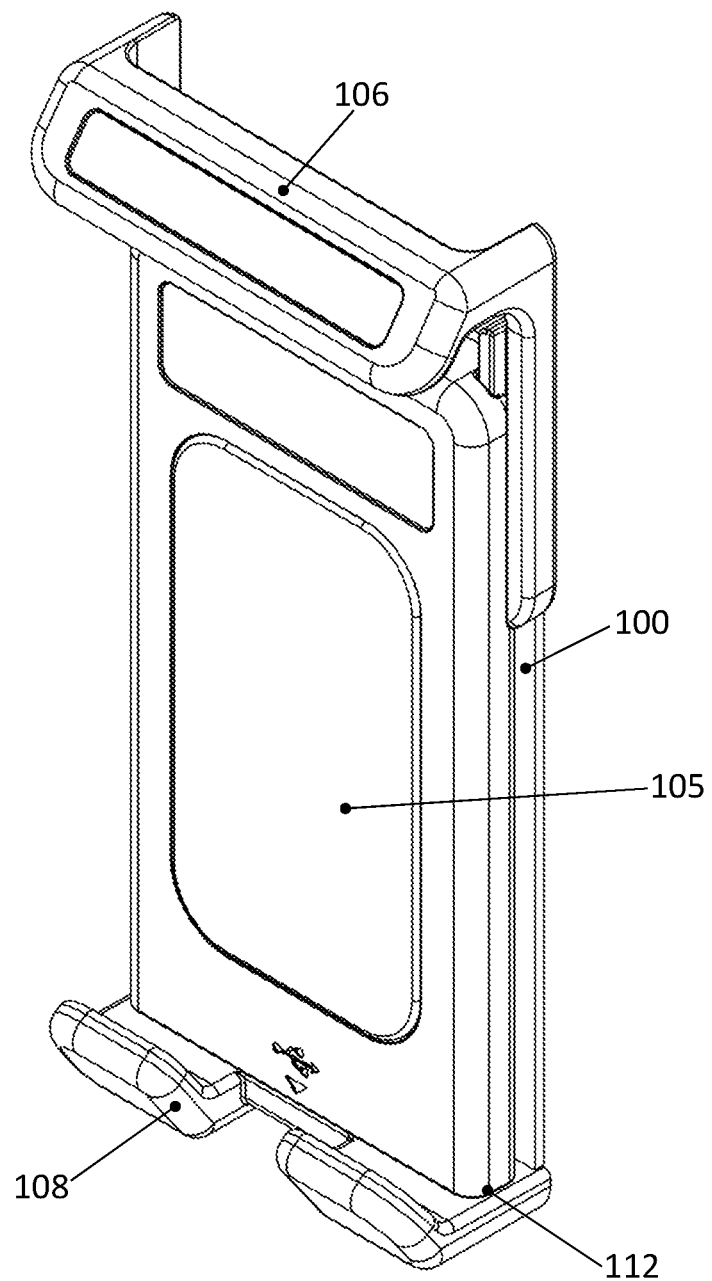
FIG. 9 shows the charging device of FIG. 9.
Figure 10:
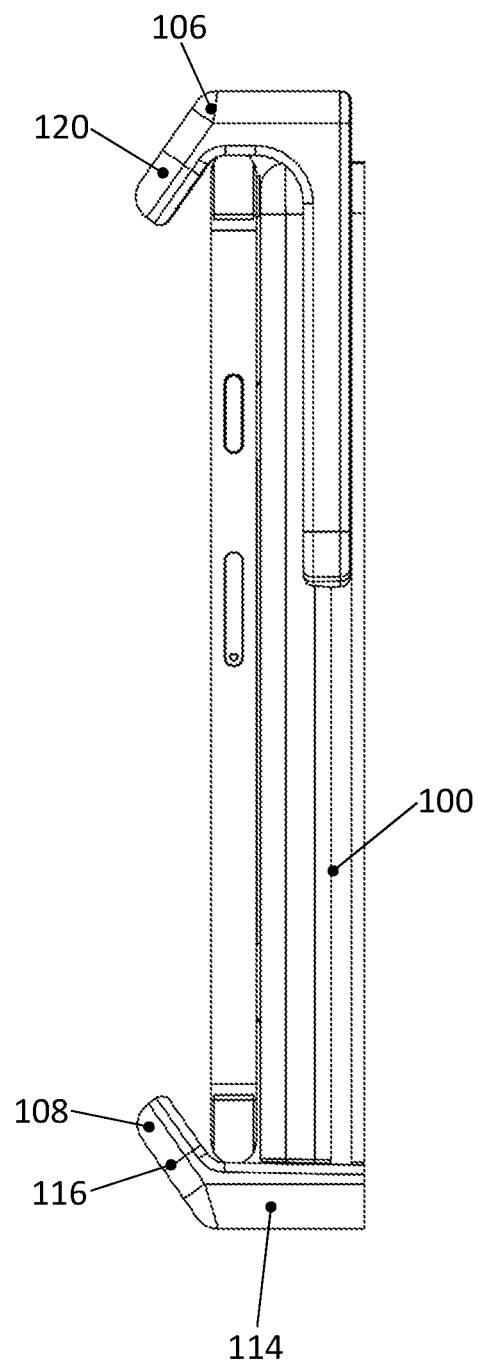
FIG. 10 is a side view of the charging device of FIG. 9, including a mobile phone.

In use, the upper clamping jaw 106 is moved to its uppermost position as shown in FIG. 9. A phone is then placed on the lower clamping jaw 108 where it is supported on the base 114 and cradled and retrained from forward movement by the support feet 116. The upper clamping jaw 106 is then slid downwards until the upper clamping member 120 engages the upper edge of the phone, as shown in FIG. 10. The forwardly and downwardly angled clamping member 120 vertically and forwardly restrains the phone, while the lower edge of the phone is also forwardly retrained by the lower clamping jaw 108. As such, the phone is supported and held in position against the inducting charging unit 105. To remove the phone the upper clamping jaw 106 is lifted in the opposing direction. The inner surfaces of the upper clamping member 120, and lower support feet 118, which contact the phone in use, may be provided with a non-slip/high grip material to cushion and or more securely retain the phone.

Figure 11:
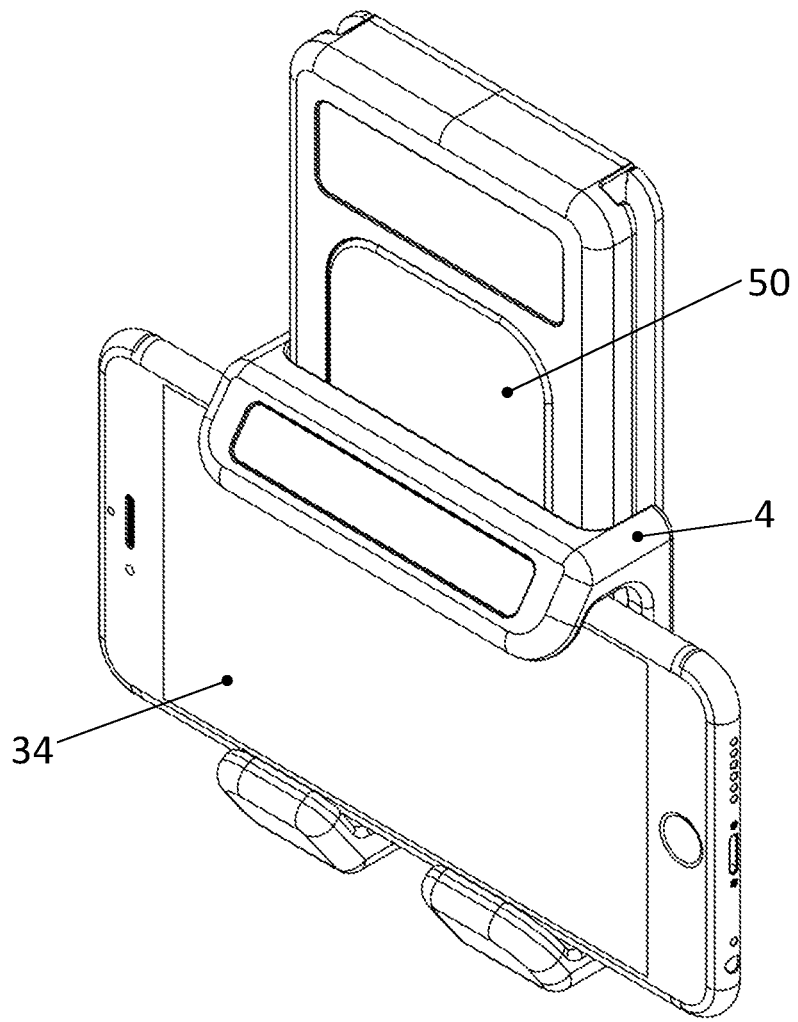
FIG. 11 shows the charging device of FIG. 9 with a mobile phone held on the landscape orientation.

As shown in FIG. 11, the phone may be supported in the holder 104 in a landscape orientation. In this orientation the upper clamping jaw 106 is slid to a lower position to engage the side edge of the phone, which is uppermost in the landscape position. The upper clamping jaw 106 is not biased in either direction, and no ratchet mechanism or other means of limiting or locating the movement of the clamping jaw are provided. This advantageously limits moving parts and ensures there are minimal components that may fail in use.

The charging device may further include a Bluetooth low energy beacon device, such as an iBeacon, for communicating with a mobile phone or other device. As shown in FIG. 12 a beacon device 50 may be configured to communicate with a portable electronic device such as a mobile phone 34 when the user places the mobile phone 34 into the holder 4. The beacon device 50 includes a transmitter that is configured to broadcast a unique identifier to the local area to be received by nearby portable electronic devices. Preferably the beacon transmitter 50 is incorporated in the inductive charger. Software on the receiving portable electronic device 34 may then perform various functions with reference to the unique identifier received from the beacon 50.

Each beacon 50 is linked to the seat to which the holder 4, in which it is incorporated, is mounted. Preferably, during installation of seats having the holders 4 mounted thereto within a vehicle, or during installation of the holders 4 to seats already installed within a vehicle, the vehicle operator (e.g. Train Operator (TOC)) will catalogue data relating to the seat positions and the unique identifier of the beacon 50 and associated charger installed on each seat. This data is logged in a database which may be stored in a Passenger Interface cloud.

When a passenger places their mobile phone 34 in the holder 4, to charge or hold their phone 34, the beacon device 50 in the inductive charger is activated. Alternatively, the beacon device 50 may broadcast continuously. In embodiments in which the holder 4 includes USB charging capability, and the phone 34 is charged via a USB connection rather than inductively, the passengers will be required to touch their phones onto the charger unit to activate the beacon 50.

When active the beacon device 50 repeatedly transmits its unique identifier signal over a predetermined short range. The range of the beacon device 50 may be selected such that it is only received by mobile devices in contact with or immediately adjacent the beacon device 50 and to prevent interference from neighbouring devices. Preferably the beacon signal is only received by devices held or placed within the holder 4 of the charging device. When the mobile device 34 is within range of the beacon device 50 the unique identifier of the beacon device 50 is received by the mobile device 34. For example, when a passenger uses the charging device to wirelessly charge their phone, or places the phone in the holder for viewing, the iBeacon signal is transmitted to the mobile device 34. The beacon device 50 may be configured such that it is only activated when the mobile device is being charged by the inductive charger.

The mobile device 34 includes a software application or 'app' provided by the vehicle operator that is reactive to receipt of the unique identifier. Once activated by receipt of the unique identifier beacon signal the app causes the mobile device 32 to send a signal to the train operator's Passenger Interface cloud using Bluetooth Low Energy or other suitable means. The signal includes the unique identifier data from the beacon device 50. A database is stored in the cloud that includes the unique identifier data of each beacon device cross referenced with the seat location information of that device and an API code identifying the train operating company. The seat location information may include the seat number, the carriage or compartment number and/or information identifying the vehicle. If the beacon unique identifier data is identified in the database, the seat location information and API code corresponding to that unique identifier is sent back to the mobile device 32. Once the API code is received by the mobile device 32 it searches for an app in which the API code is embedded. The app is then provided with the seat location data received from the Passenger Interface cloud.

At this stage the beacon device 50 has established communication between the passenger's phone and the operator's app. The vehicle operator's app includes information relating to the passenger that is provided to the app by the passenger. Therefore, once the app has received the seat location data from the cloud it is able to associate the passenger with their seat location by virtue of the association made between the unique identifier of the beacon device 50 and the seat location data. The vehicle operator's app is able to perform operations based on the seat location of the charging device with which the phone is associated and/or the identity of the passenger, during which it may communicate with the train operator's cloud.

During this process, no data is taken by the beacon device 50. Instead, the beacon device provides a "handshake" service that connects the passenger's phone with operator's app.

The system may be configured such that connection to the operator's app by the user is optional. Upon connection receipt of a signal from the beacon device 50 the user may be provided, via the phone, with an option to accept the connection to the app or not. Accepting connection in response to the beacon signal may allow the phone to communicate via cloud-based API. Using a train operating company (TOC) as an example, the TOC system may then communicate with the customer's phone. The unique identification data of the beacon device 50, which is linked to the seat location, means the TOC system can communicate with a customer's phone for the purpose of smart seating; i.e. enabling the customer to check their mobile ticket into the seat thus allowing the train manager to know that the seat is occupied by someone with a valid ticket. The unique identifier of each charging device allows the TOC to link a valid ticket to a specific seat, and by knowing whether a specific seat is occupied the TOC may operate smart seating and smart ticketing systems. The beacon device 50 enables the phone to integrate with the train management system for applications such as smart ticketing, at-seat refreshment orders, advertising, sponsorship, and personalised passenger information, as well as enabling TOCs to analyse passenger behaviour. While beacon devices such as iBeacon are known in certain fields, the application of beacon devices in public transport in this manner has not to date been contemplated and provides unique and not previously conceived benefits in this environment.

The invention claimed is:

1. An inductive charging device comprising:
   a main body including an inductive charging unit; and
   a holder for holding a mobile device in a fixed charging position relative to the inductive charging unit;
   wherein the holder comprises:
      a lower clamping jaw fixed relative to the main body; and
      an upper clamping jaw slidably mounted to the main body above the lower clamping jaw such that the upper clamping jaw is able to freely slide vertically relative to the main body towards and away from the lower clamping jaw between an uppermost position and a lower clamping position;
   wherein the lower clamping jaw comprises a cradle section for receiving and supporting a mobile device;
   wherein the upper and lower clamping jaws are arranged such that:
      when the upper clamping jaw is in the uppermost position, a mobile device may be inserted between the upper and lower clamping jaws; and
      when the upper clamping jaw is moved downwardly to the lower clamping position, a mobile device is clamped between the upper and lower clamping jaws; and
   wherein the upper clamping jaw is unbiased and freely slidable with no mechanism for fixing the upper clamping jaw in the lower clamping position.

2. An inductive charging device for charging a mobile device within a public transport vehicle, the inductive charging device comprising:
   a main body including an inductive charging unit comprising a planar front surface; and
   a holder for holding a mobile device in a fixed charging position relative to the inductive charging unit;
   wherein the holder comprises:
      a plurality of rigid arms, fixed in position relative to the main body; and a plurality of biasing members movable between an extended position and a retracted position;
wherein the plurality of biasing members are arranged within the holder such that the plurality of biasing members are moved to the retracted position when a mobile device is inserted into the holder;
wherein, when in the retracted position, the plurality of biasing members apply an inwardly biasing force to the mobile device to hold the mobile device in the charging position; and
wherein the plurality of biasing members includes a first pair of lateral biasing members arranged within the holder such that, in the retracted position, the first pair of lateral biasing members impart an inward biasing force in opposing lateral directions parallel to the planar front surface of the inductive charging unit.

3. The inductive charging device according to claim 1, wherein the inductive charging unit comprises a planar front surface; and
wherein the inductive charging unit is for charging a mobile device within a public transport vehicle.

4. The inductive charging device according to claim 2, wherein the plurality of biasing members further includes at least one rearward biasing member arranged within the holder such that, in the retracted positions, the at least one rearward biasing member imparts an inward biasing force in a rearward direction towards and a front surface of the inductive charging unit.

5. The inductive charging device according to claim 4, wherein the holder further comprises a pair of support arms located on opposing sides of the main body;
wherein each support arm includes a first laterally restraining section extending forwardly in a direction away from the front surface of the inductive charging unit, and a second forwardly restraining section extending inwardly from the first laterally restraining section in a direction parallel to the front surface of the inductive charging unit; and
wherein the pair of support arms each have a distal end and the distal ends are laterally spaced from each to define a viewing space through which the screen of a mobile device is visible when held in the holder.

6. The inductive charging device according to claim 5, wherein each support arm contains a grip member mounted on its inner surface; and
wherein each grip member comprises one of the rearward biasing members and one of the lateral biasing members.

7. The inductive charging device according to claim 6, wherein the grip members are formed from spring steel and the plurality of biasing members are integral parts of the grip members.

8. The inductive charging device according to claim 7, wherein the plurality of biasing members are integral cantilever springs having an inwardly extending convex profile.

9. A public transport vehicle comprising:
a plurality of inductive charging devices, each according to claim 1;
wherein each inductive charging device is individually mounted to a corresponding one of a corresponding plurality of chairs within the public transport vehicle; and
wherein each inductive charging device is connected to a power source with the public transport vehicle.

10. The inductive charging device according to claim 1, wherein the main body further includes guide channels; and
wherein the upper clamping jaw comprises guide rails that are slidingly received within the guide channels of the main body.

11. The inductive charging device according to claim 1, wherein the main body further includes a front panel and a rear panel;
wherein the inductive charging unit is located between the front panel and the rear panel; and
wherein the front panel includes an aperture for receiving a charging panel of the inductive charging unit such that, when a mobile device is clamped between the upper and lower clamping jaws, the charging panel is contacted by a mobile device from the front of the main body.

12. The inductive charging device according to claim 1, wherein the upper clamping jaw comprises:
a clamping member;
a pair of vertically extending, laterally spaced legs arranged at either side of the main body, wherein each laterally spaced leg has an upper end and a lower end; and
a pair of support arms extending forwardly from the upper ends of the laterally spaced legs and connected to the clamping member;
wherein the laterally spaced legs are slidingly connected to the main body to allow the clamping member to slide vertically relative to the main body; and
wherein the support arms support the clamping member forwardly of the main body to prevent interference between the clamping member and the main body when the upper clamping jaw is moved between the uppermost position and lower clamping position.

13. The inductive charging device according to claim 12, wherein the support arms are arranged outwardly of side edges of the main body.

14. The inductive charging device according to claim 13, wherein the main body further includes a front panel, a rear panel, and vertically extending internal guide channels located at either side of the main body between the front panel and the rear panel; and
wherein the laterally spaced legs of the upper clamping jaw include guide rails that are slidingly received within the vertically extending internal guide channels.

15. The inductive charging device according to claim 14, wherein each of the laterally spaced legs comprises:
an inner guide rail located within one of the vertically extending internal guide channels that is held between the front and rear panels; and
a laterally spaced outer guide rail arranged outwardly of a side edge of the main body.

16. The inductive charging device according to claim 14, wherein each of the vertically extending internal guide channels has a first stop element located at an upper end of the vertically extending internal guide channel;
wherein each of the laterally spaced legs has a corresponding second stop element located at a lower end of the laterally spaced legs;
wherein the first and second stop elements are arranged to cooperate to limit upward movement of the upper sliding jaw and define the uppermost position.

17. The inductive charging device according to claim 1, wherein the upper and lower clamping jaws are each open at side edges to allow a mobile device to extend outwardly of the side edges of the upper and lower clamping jaws, thereby enabling the clamping jaws to support a mobile device having a width greater than the widths of the upper and lower clamping jaws.

18. The inductive charging device according to claim 1, wherein, when the upper clamping jaw is in the uppermost position, the upper and lower clamping jaws are able to receive a mobile device in a portrait orientation; and
    wherein, wherein the upper clamping jaw is in the lower clamping position, the upper and lower clamping jaws are able to clamp a mobile device in a landscape orientation.

19. The inductive charging device according to claim 1, wherein the upper and lower clamping jaws each include a forwardly angled clamping member;
    wherein the forwardly angled clamping member of the lower clamping jaw is angled forwardly in an upwards direction; and
    wherein the forwardly angled clamping member of the upper clamping jaw is angled forwardly in a downwards direction.

\* \* \* \* \*